Aug. 19, 1924.
D. E. MILLER
AEROPLANE
Filed Sept. 27, 1922
1,505,911
2 Sheets-Sheet 2
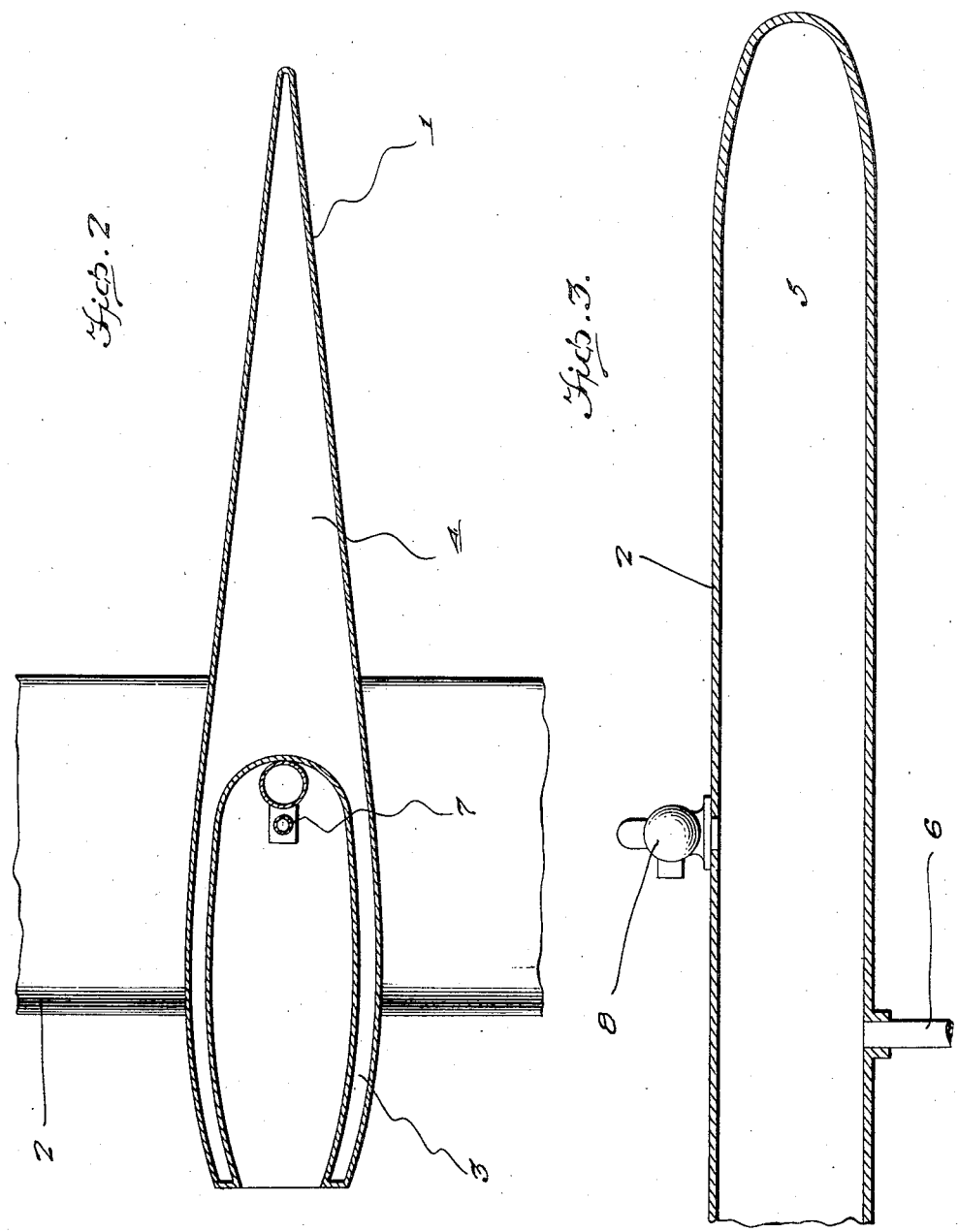
D. E. Miller
INVENTOR Patented Aug. 19, 1924.

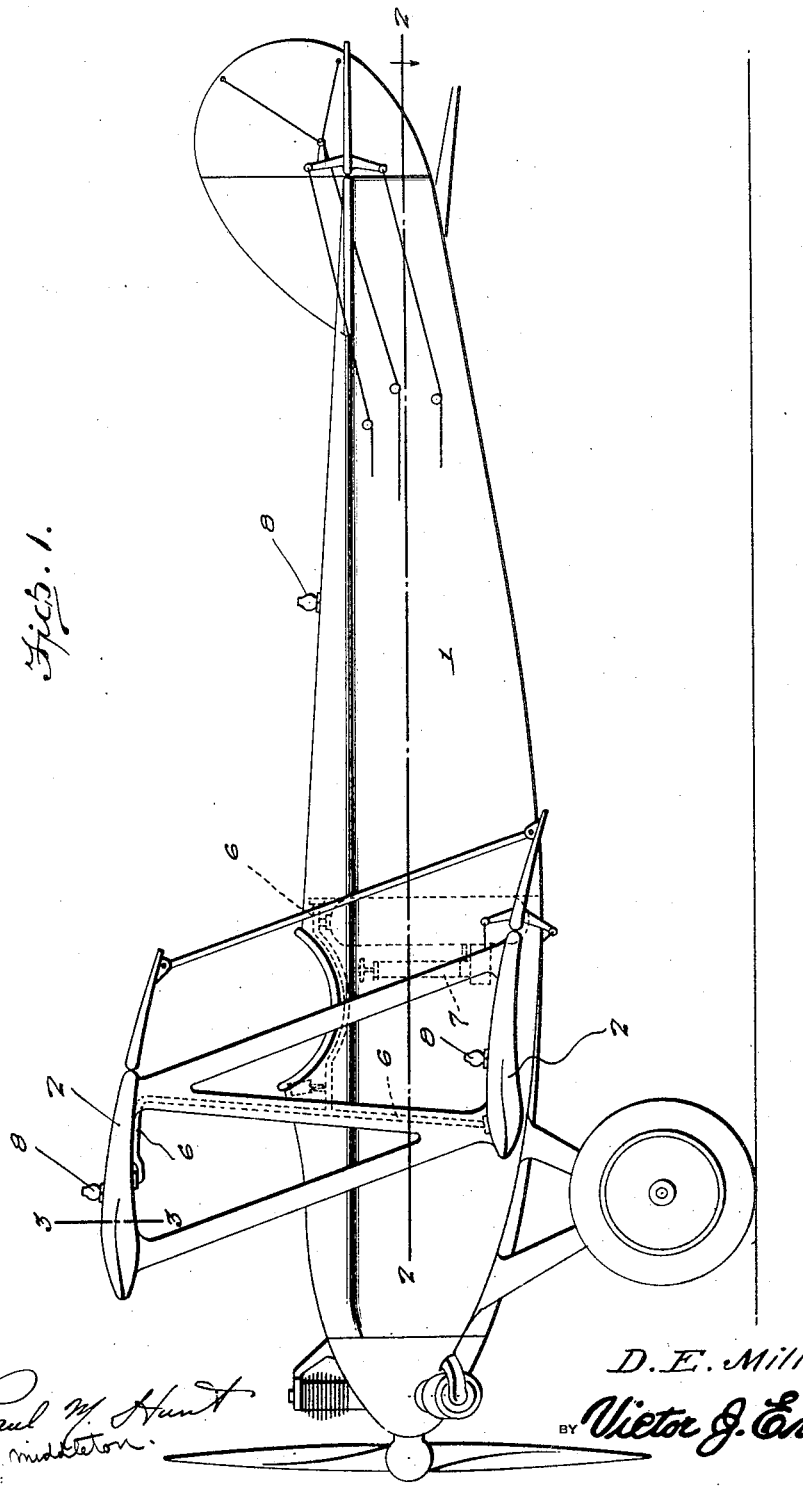

1,505,911

UNITED STATES PATENT OFFICE.

DENVER E. MILLER, OF SHOUNS, TENNESSEE.

AEROPLANE.

Application filed September 27, 1922. Serial No. 590,879.

*To all whom it may concern:*

Be it known that I, DENVER E. MILLER, a citizen of the United States, residing at Shouns, in the county of Johnson and State of Tennessee, have invented new and useful Improvements in Aeroplanes, of which the following is a specification.

This invention relates to improvements in aeroplanes, the general object of the invention being to make the various parts of the ship hollow and to introduce into the hollow parts gases that are lighter than air so that the craft will have buoyant qualities.

Another object of the invention is to connect the wings with the interior of the fuselage and to provide pump means for circulating the gases from the fuselage to the wings.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view showing an aircraft constructed in accordance with this invention.

Figure 2 is a section on line 2—2 of Figure 1.

Figure 3 is a section on line 3—3 of Figure 1.

The remaining figures are detail views.

In these views 1 indicates the fuselage of the aircraft and 2 the wings thereof. The entire shell of the fuselage is made of double walls so as to provide a space 3 and compartments 4 are formed in the fuselage. The wings 2 are also provided with interior spaces 5 and the various spaces and compartments are connected together by the pipes 6 to which is connected a pump 7 so that gases lighter than air can be pumped into the spaces and compartments to make the craft buoyant. Valves 8 are provided for permitting the gas to be exhausted from the spaces when desired.

From the foregoing it will be seen that the craft will have buoyant qualities so that it will remain in the air with but little engine power.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An air craft of the class described comprising a body formed with double walls, compartments in the body communicating with the spaces between the walls, hollow wings, a gas receptacle, pipes connecting the same with the spaces in the wings and body and a pump for forcing the gas into the spaces and valves for permitting the gas to be exhausted from said spaces.

In testimony whereof I affix my signature.

DENVER E. MILLER.